(12) United States Patent
Chui

(10) Patent No.: US 11,957,254 B2
(45) Date of Patent: Apr. 16, 2024

(54) SUPPORT CONNECTING STRUCTURE, SUPPORT, BABY CRIB, AND CRIB BODY OF BABY CRIB

(71) Applicant: WONDERLAND SWITZERLAND AG, Steinhausen (CH)

(72) Inventor: Zongwang Chui, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 52 days.

(21) Appl. No.: 17/586,293

(22) Filed: Jan. 27, 2022

(65) Prior Publication Data

US 2022/0235804 A1 Jul. 28, 2022

(30) Foreign Application Priority Data

Jan. 28, 2021 (CN) .......................... 202110118810.7

(51) Int. Cl.
*A47D 9/00* (2006.01)
*F16B 7/22* (2006.01)

(52) U.S. Cl.
CPC ............. *A47D 9/008* (2022.08); *A47D 9/012* (2022.08); *F16B 7/22* (2013.01)

(58) Field of Classification Search
CPC .......... A47D 9/00; A47D 9/005; A47D 9/008; A47D 9/012; A47D 9/016; A47D 13/06; A47D 13/061; A47D 13/066; F16B 7/22
See application file for complete search history.

(56) References Cited

U.S. PATENT DOCUMENTS

| | | | |
|---|---|---|---|
| 8,336,135 B2 | 12/2012 | Lin et al. | |
| 2013/0074257 A1* | 3/2013 | Mendes | F16C 11/10 |
| | | | 16/349 |
| 2017/0065100 A1* | 3/2017 | Lange | A47D 13/063 |
| 2017/0172311 A1* | 6/2017 | Longenecker | A47D 13/061 |
| 2018/0008056 A1* | 1/2018 | Yang | F16B 7/14 |

(Continued)

FOREIGN PATENT DOCUMENTS

| | | |
|---|---|---|
| CN | 2276289 Y | 3/1998 |
| CN | 101131172 A | 2/2008 |

(Continued)

OTHER PUBLICATIONS

Office Action dated Jan. 11, 2023 from corresponding application No. TW 111103503 (10 pages; English translation 18 pages).

*Primary Examiner* — David R Hare
*Assistant Examiner* — George Sun
(74) *Attorney, Agent, or Firm* — HAUPTMAN HAM, LLP

(57) ABSTRACT

A support connecting structure includes: a pivoting base; a pivoting arm, wherein a first end of the pivoting arm is connected to the pivoting base by a first pin shaft, and the first end of the pivoting arm comprises a first anti-rotation surface; and a locking member mounted to the pivoting base, the locking member being capable of moving in a direction parallel to an axis of the first pin shaft from a locked position to an unlocked position, and the locking member comprising a second anti-rotation surface; wherein when the locking member is at the locked position, the first anti-rotation surface abuts against the second anti-rotation surface, and when the locking member is at the unlocked position, the first anti-rotation surface is separated from the second anti-rotation surface.

28 Claims, 9 Drawing Sheets

(56) References Cited

U.S. PATENT DOCUMENTS

| | | | |
|---|---|---|---|
| 2019/0053636 A1* | 2/2019 | Horst | A47D 11/005 |
| 2020/0281369 A1* | 9/2020 | Juchniewicz | A47D 7/002 |
| 2021/0076842 A1* | 3/2021 | Guo | A47D 9/02 |
| 2022/0007853 A1* | 1/2022 | Guo | A47D 15/008 |

FOREIGN PATENT DOCUMENTS

| | | | | |
|---|---|---|---|---|
| CN | 201840125 U | | 5/2011 | |
| CN | 201888562 | | 7/2011 | |
| CN | 201888562 U | * | 7/2011 | A47D 13/06 |
| CN | 103315565 A | | 9/2013 | |
| CN | 208435089 U | | 1/2019 | |
| CN | 209202553 U | | 8/2019 | |
| EP | 2614754 B1 | | 1/2015 | |
| GB | 2480509 B | | 11/2014 | |

\* cited by examiner

SUPPORT CONNECTING STRUCTURE, SUPPORT, BABY CRIB, AND CRIB BODY OF BABY CRIB

CROSS-REFERENCE TO RELATED APPLICATIONS

This application claims to the priority of Chinese Patent Application No. 2021101188107, filed on Jan. 28, 2021, the entire contents of which is incorporated herein by reference.

TECHNICAL FIELD

The present disclosure relates to a support connecting structure, a support, a baby crib, and a crib body of the baby crib.

BACKGROUND

Baby crib is a practical tool for placing babies. The conventional baby crib is generally manufactured by assembling solid woods into a fixed form. Customers buy the baby crib and place it in a fixed place at home. As the baby grows, more indoor space is required for activities of the babies. However, the conventional baby crib cannot meet requirements of folding and easy storage. Therefore, a foldable baby crib emerged. The foldable baby crib has the advantages such as easy assembly, disassembly, and storage, and therefore is favored by many customers. However, the disassembly and folding of the conventional foldable baby crib is complex and time-consuming.

SUMMARY

According to various embodiments, a support connecting structure, a support, and a baby crib and a crib body of the baby crib are provided.

A support connecting structure includes: a pivoting base; a pivoting arm, wherein a first end of the pivoting arm is connected to the pivoting base by a first pin shaft, and the first end of the pivoting arm comprises a first anti-rotation surface; and a locking member mounted to the pivoting base, the locking member being capable of moving in a direction parallel to an axis of the first pin shaft so as to move to a locked position or an unlocked position, and the locking member comprising a second anti-rotation surface; wherein when the locking member is at the locked position, the first anti-rotation surface abuts against the second anti-rotation surface, and when the locking member is at the unlocked position, the first anti-rotation surface is separated from the second anti-rotation surface.

A crib body of a baby crib includes the foregoing support connecting structure.

A baby crib includes the foregoing crib body of a baby crib. The baby crib further includes a crib support connected to the crib body.

A baby crib includes: a crib body comprising the support connecting structure according to claim 18, wherein the crib body comprises an upper crib fence and a lower crib fence, wherein the upper crib fence and the lower crib fence each comprises a pair of first connecting rods opposite to each other and a pair of second connecting rods opposite to each other, and each first connecting rod and each second connecting rod adjacent to each other are connected by a corner connector, wherein the corner connector of the upper crib fence is connected to the corner connector of the lower crib fence by a vertical connector; each first connecting rod comprises a first rotary arm and a second rotary arm, end portions of the first rotary arm and the second rotary arm facing each other are respectively pivotally connected to hinged bases, and end portions of the first rotary arm and the second rotary arm away from each other are respectively pivotally connected to the corresponding corner connectors, so as to allow the hinged base of the upper crib fence and the corresponding hinged base of the lower crib fence to approach each other during folding of the crib body, such that the pair of second connecting rods of the upper crib fence approach each other and the pair of second connecting rods of the lower crib fence approach each other; and a crib support configured to support the crib body and detachably connected to the crib body, wherein the crib support comprises a pair of vertical supports and bases connected to the vertical supports, respectively, an upper end of each vertical support is detachably connected to the hinged base of the upper crib fence; wherein the first rotary arm and the second rotary arm of the first connecting rod of the upper crib fence serve respectively as the pivoting arms of the support connecting structure, the hinged base corresponding to the first connecting rod serves as the pivoting base of the support connecting structure, and the vertical support connected to the hinged base of the first connecting rod serves as the fixing arm.

A support includes: a pivoting base having a pivoted connection portion and a slideway, an extending direction of the slideway being parallel to a pivot axis of the pivoted connection portion; a locking member comprising a second anti-rotation surface, wherein the locking member is slidably mated with the slideway to move the locking member to a locked position or an unlocked position, when the locking member is moved to the locked position, the second anti-rotation surface provides a locking effect, and when the locking member is moved to the unlocked position, the locking effect of the second anti-rotation surface is released.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
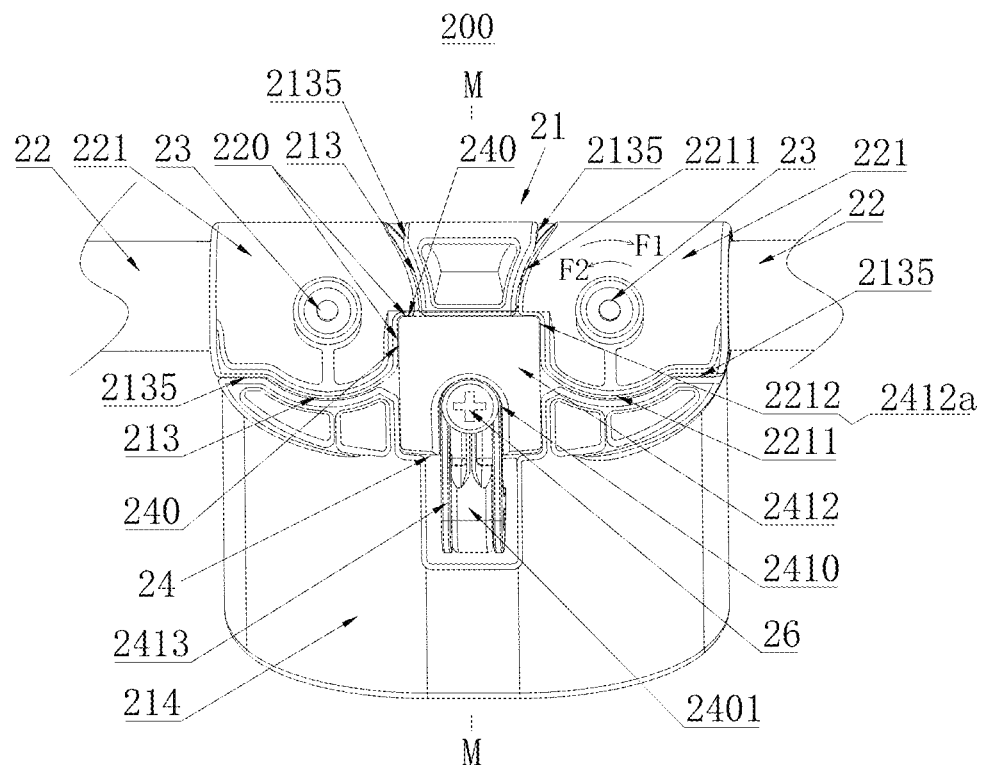
FIG. 1 is a schematic front view of a support connecting structure according to an embodiment.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 to FIG. 4 are schematic diagrams of a support connecting structure 200 according to an embodiment. The support connecting structure 200 includes a pivoting base 21, at least one arm 22, and a locking member 24. The pivoting arm 22 and the locking member 24 are mounted to the pivoting base 21. The support connecting structure 200 is applicable to, for example, a baby carrier. The baby carrier may be, for example, a baby crib (including a baby hammock, a baby playpen, and other types of baby cribs), a baby stroller, or the like. Rods of the baby carrier provided with the support connecting structure 200 can be unfolded and folded. Therefore, the baby carrier can be switched between a use state and a folded state to satisfy different use requirements of users.

Figure 2:
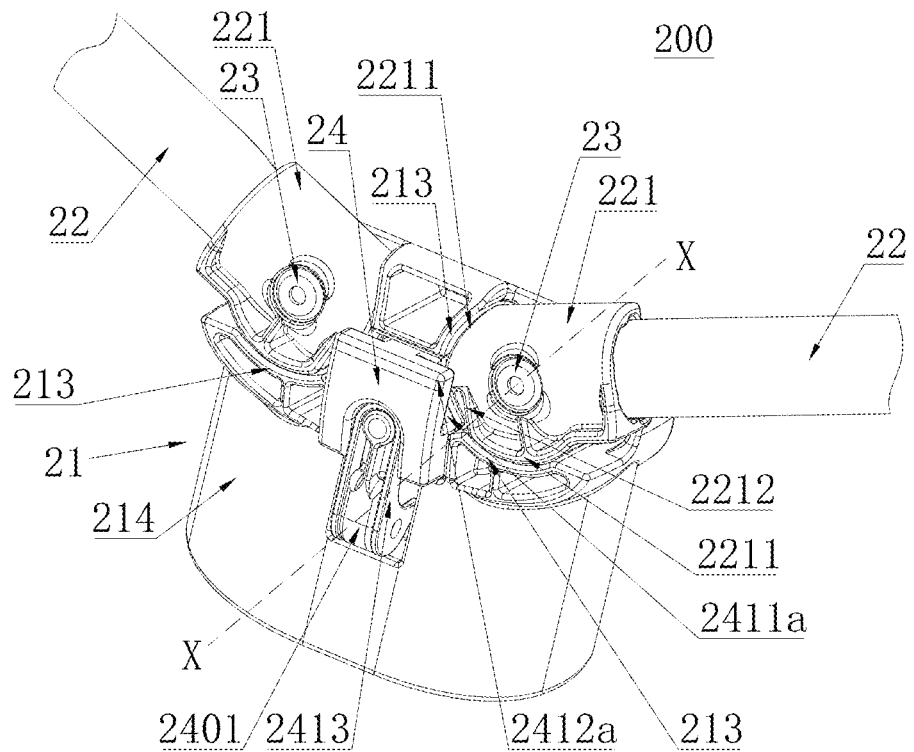
FIG. 2 is a schematic perspective view of the support connecting structure of FIG. 1.
Figure 3:
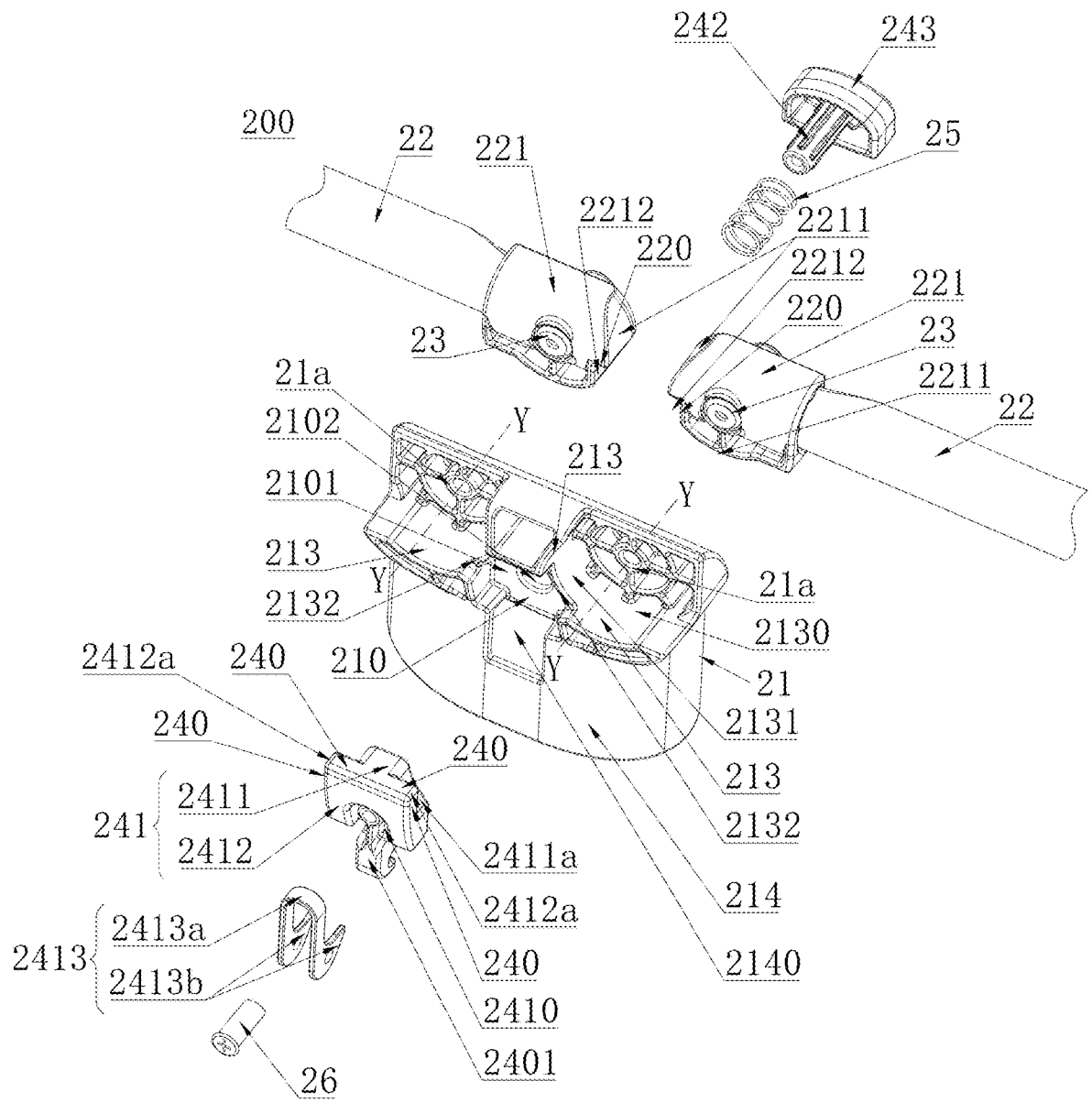
FIG. 3 is a schematic exploded view of the support connecting structure of FIG. 2.

In some embodiments, referring to FIG. 1 to FIG. 3, the support connecting structure 200 includes two pivoting arms 22, and the pivoting base 21 includes a pivoted connection portion 21a. First ends 221 of the two pivoting arms 22 are respectively and pivotally connected to the pivoted connection portion 21a by two first pin shafts 23. An axis X-X of each first pin shaft 23 is a pivot axis of the pivoting arm 22 corresponding to the first pin shaft 23. When the pivoting arm 22 is mounted to the pivoting base 21, a pivot axis Y-Y of the pivoted connection portion 21a coincides with the axis X-X of the first pin shaft 23. In some embodiments, the first ends 221 of the two pivoting arms 22 are mated with the same locking member 24 located between the first ends 221. In some embodiments, a geometric structure of the pivoting base 21 may be, for example, symmetrical with respect to a median surface M-M between the two first pin shafts 23. The median surface M-M is parallel to the axis X-X of each first pin shaft 23 and perpendicular to a line connecting centers of the two first pin shafts 23. The first end 221 of each pivoting arm 22 includes a first anti-rotation surface 220. In some embodiments, the first end 221 of each pivoting arm 22 is formed by a plastic member sleeved on a rod-shaped member. In some other embodiments, each pivoting arm 22 may be an integrally formed member.

The locking member 24 is mounted to the pivoting base 21 and is capable of moving in a direction parallel to the axis X-X of the first pin shaft 23, therefore the locking member 24 can move to a locked position or an unlocked position. The locking member 24 includes second anti-rotation surfaces 240 that can be mated with the first anti-rotation surfaces 220 of the two pivoting arms 22, respectively. When the locking member 24 is moved to the locked position, the first anti-rotation surface 220 of each pivoting arm 22 can abut against one of the second anti-rotation surfaces 240 of the locking member 24, so as to prevent the pivoting arm 22 from rotating about the first pin shaft 23, such that relative positions of the pivoting arm 22 and the pivoting base 21 can be fixed. That is to say, the locking member 24 locks the pivoting arm 22 at a predetermined pivot position. When the locking member 24 is moved to the unlocked position, the first anti-rotation surface 220 is separated from the second anti-rotation surface 240, and the locking member 24 does not intervene in the rotation of the pivoting arm 22. That is to say, the locking member 24 releases locking of the pivoting arm 22 at the predetermined pivot position. As such, the pivoting arm 22 can rotate about the first pin shaft 23 to an appropriate position. In some other embodiments, the support connecting structure 200 may include one pivoting arm 22 and one locking member 24. Rotation or rest of the pivoting arm 22 relative to the pivoting base 21 is controlled by an axial moving of the locking member 24.

According to the support connecting structure 200 provided in the above embodiments, by changing the axial position of the locking member 24, the rotation of the pivoting arm 22 can be restrained or allowed. Therefore, the support connecting structure 200 having a simple structure and easily changed in state is provided.

Figure 4:
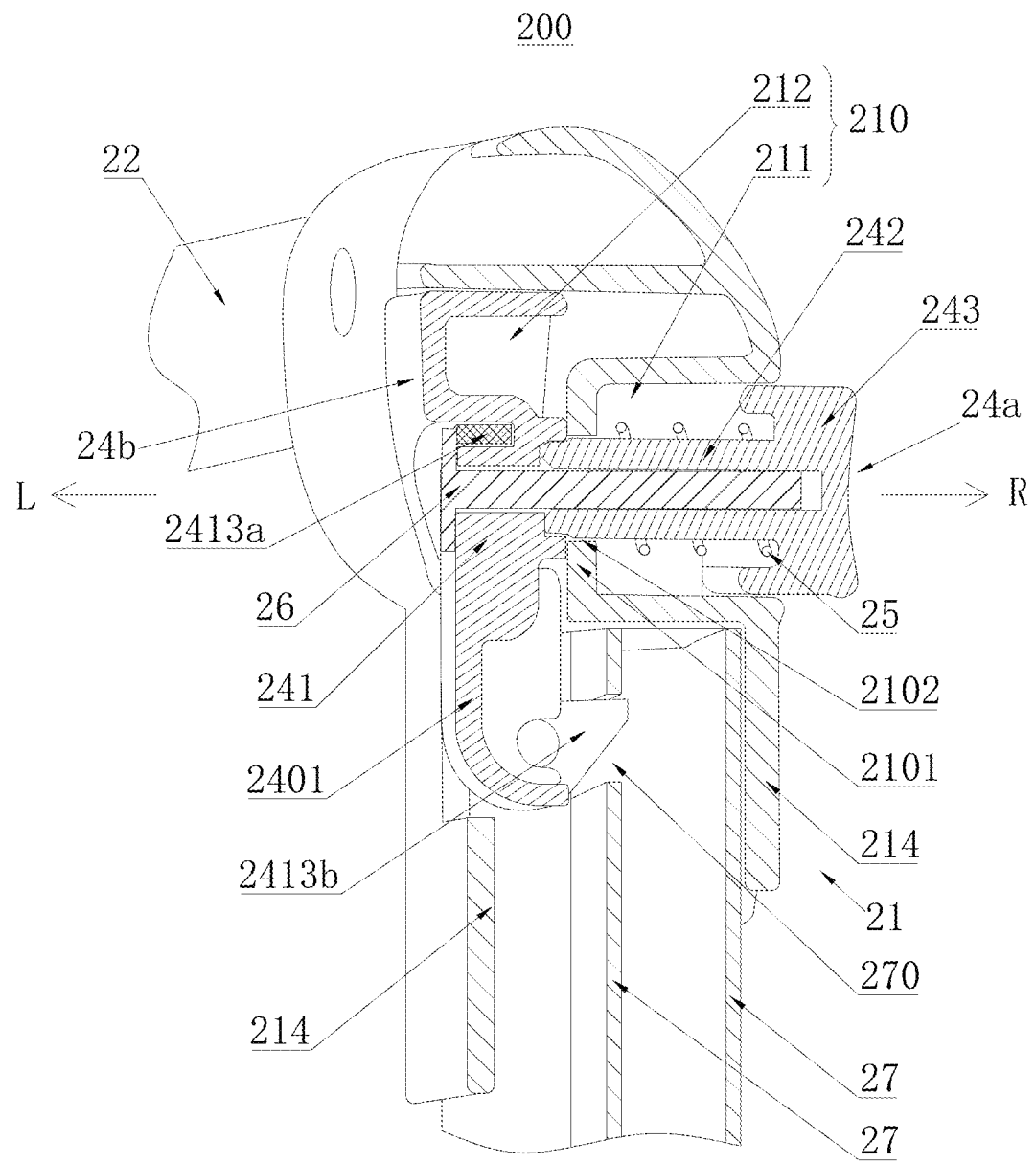
FIG. 4 is a schematic cross-sectional view of the support connecting structure of FIG. 1.

Referring to FIG. 3 and FIG. 4, in some embodiments, the pivoting base 21 includes a slideway 210 slidably mated with the locking member 24. An extending direction of the slideway 210 is parallel to the axis X-X of the first pin shaft 23. In some embodiments, the locking member 24 may be non-rotatable relative to the slideway 210. That is to say, the rotation of the locking member 24 is limited by the slideway 210. As such, when the first anti-rotation surface 220 abuts against the second anti-rotation surface 240, the pivoting arm 22 does not push the locking member 24 to rotate. Many methods are available to implement an axial movement of the locking member 24 relative to the slideway 210 while avoiding the rotation of the locking member 24 relative to the slideway 210. For example, a surface of the locking member 24 in contact with the slideway 210 can be configured to be a non-circular surface (for example, a rectangular surface, or a polygonal surface, or special-shaped surface). Alternatively, the surface of the locking member 24 in contact with the slideway 210 can be configured to be a circular surface having a radial protrusion and a radial recess. In some other embodiments, the rotation of the locking member 24 may not be limited by the slideway 210, as long as the locking member 24 at the locked position can lock the pivoting arm 22 in a pivot position.

In some embodiments, the switching of the locking member 24 between the locked position and the unlocked position can be achieved by a user to push a load bearing end 24a of the locking member 24, so as to move the locking member 24 in an axial direction parallel to the axis X-X of the first pin shaft 23. In some embodiments, the support connecting structure 200 may further include an elastic restoring element 25. The elastic restoring element 25 is configured to keep the locking member 24 at the locked position. Subjected to an external force, the locking member 24 is capable of overcoming a force of the elastic restoring element 25 and moving to the unlocked position. As such, the locking member 24 is kept at the locked position in a normal state, such that the stability of the locking member 24 at the locked position is maintained. When the locking member 24 is required to be switched to the unlocked position, only an axial force is required to be applied to the locking member 24. The elastic restoring element 25 may be, for example, a spring sleeved on the locking member 24. When the locking member 24 is pushed by the external force to move to the unlocked position, the spring is stretched or compressed. When the external force is removed, the spring can immediately drive the locking member 24 to automatically return to the locked position and can keep the locking member 24 at the locked position.

In some embodiments, an axial limiting structure configured to prevent the locking member 24 from accidentally disengaging from the slideway 210 may be further disposed on the pivoting base 21. The axial limiting structure may be designed in any appropriate manner. Some embodiments of the axial limiting structure are described below.

In addition, in some embodiments, in order to reduce a possibility of unexpected axial movement of the locking member 24 at the locked position to the unlocked position as a result of accidental touch, when the locking member 24 is at the locked position, the load bearing end 24a of the locking member 24 and the other end 24b opposite to the load bearing end 24a do not protrude out of the slideway 210. That is to say, the projections of the load bearing end 24a and the other end 24b onto a plane parallel to the axis X-X are within the slideway 210 and between both ends of the slideway 210. In some embodiments, only one of the load bearing end 24a and the other end 24b does not protrude out of the slideway 210. It is to be noted that, a situation that an end portion of the locking member 24 slightly protrudes out of the slideway 210 also falls within the protection scope of the present disclosure. In some embodiments, in order to facilitate the application of the external force to the locking member 24, when the locking member 24 is at the locked position, the load bearing end 24a configured to receive the external force may protrude out of the slideway 210 (as shown in FIG. 4).

Referring to FIG. 1 to FIG. 4, in some embodiments, the first end 221 of the pivoting arm 22 includes a recessed stop 2212, and the locking member 24 includes a protruding stop 2412a. A surface of the recessed stop 2212 is configured to form the first anti-rotation surface 220. A surface of the protruding stop 2412a is configured to form the second anti-rotation surface 240. By moving the locking member 24 to the locked position, the recessed stop 2212 and the protruding stop 2412a are snapped, and the first anti-rotation surface 220 abuts against the second anti-rotation surface 240, such that the pivoting arm 22 can be prevented from rotating. When the locking member 24 is moved to the unlocked position, the recessed stop 2212 and the protruding stop 2412a are staggered from each other in an axial direction, and the locking member 24 does not limit the rotating of the pivoting arm 22. Therefore, the pivoting arm 22 can rotate about the axis X-X of the first pin shaft 23. In other embodiments, the recessed stop 2212 on the first end of the pivoting arm 22 and the protruding stop 2412a on the locking member 24 may be interchanged.

Referring to FIG. 3, in some embodiments, the pivoting base 21 may further include arcuate walls 213 concentric with the first pin shafts 23, respectively. A middle portion of the arcuate wall 213 has an overlapping portion 2131 that coincides with the slideway 210. A notch 2132 is formed in the overlapping portion 2131. The first end 221 of the pivoting arm 22 includes an arcuate portion 2211 slidably mated with an inner wall surface 2130 of the arcuate wall 213, and the recessed stop 2212 is located at the middle portion of the arcuate portion 2211. Referring to FIG. 1 and FIG. 3, when the locking member 24 is at the locked position, the protruding stop 2412a of the locking member 24 is latched in the notch 2132. In this case, the axial position of the locking member 24 is limited. The protruding stop 2412a extends into the recessed stop 2212 of the first end 221 of the pivoting arm 22 through the notch 2132 and is snapped into the recessed stop 2212, such that the second anti-rotation surface 240 can abut against the first anti-rotation surface 220. As such, the pivoting arm 22 is prevented from rotating in a clockwise direction F1 and in a counterclockwise direction F2 (as shown in FIG. 1). In the above embodiments, by means of the structures such as the arcuate wall 213 and the notch 2132, the protruding stop 2412a is snapped into the recessed stop 2212 through the notch 2132. As such, not only the structural strength of the pivoting base 21 is guaranteed, but also an overall size of the support connecting structure along the axis X-X can be reduced.

In some embodiments, the first anti-rotation surface 220 may be an inclined surface or a bending surface, and/or the second anti-rotation surface 240 may be an inclined surface or a bending surface. The bending surface may be a right-angled bending surface, a bending surface having a plurality of bends, or any other appropriate bending surfaces, as long as the pivoting arm 22 can be prevented from rotating. It should be understood that, by designing suitable shapes for the notch 2132 and the protruding stop 2412a, even through the rotation of the locking member is not limited by the slideway 210, the locking member 24 at the locked position can still lock the pivot position of the pivoting arm 22.

Referring to FIG. 3, in some embodiments, the locking member 24 may include a first slider portion 2411 and a second slider portion 2412 that are successively disposed in a sliding direction of the locking member 24 and respectively slidably mated with the slideway 210. The first slider portion 2411 and the second slider portion 2412 can form a slider 241. The slider 241 is, for example, an integrally formed member. The second slider portion 2412 is away from the slideway 210, while the first slider portion 2411 faces the slideway 210. The first slider portion 2411 has an avoiding surface 2411*a*. The avoiding surface 2411*a* may be slidably mated with the overlapping portion 2131 and can move to the notch 2132. The protruding stop 2412*a* is located on the second slider portion 2412. Still referring to FIG. 1, in some embodiments, the second slider portion 2412 may have a substantially rectangular shape. Two adjacent rectangular corners of the second slider portion 2412 form the protruding stops 2412*a*, which can be respectively mated with the recessed stops 2212 on the first ends of the two pivoting arms 22. In this case, the first anti-rotation surface 220 and the second anti-rotation surface 240 may be substantially right-angled bending surfaces.

When the locking member 24 is subjected to the external force and overcomes the force of the elastic restoring element 25 to move to the unlocked position, the second slider portion 2412 is moved outward and drives the protruding stop 2412*a* to move out of the notch 2132, the second anti-rotation surface 240 is separated from the first anti-rotation surface 220, and the avoiding surface 2411*a* of the first slider portion 2411 is slid to the notch 2132 along an outer wall surface of the overlapping portion 2131 and therefore does not intervene in the rotation of the pivoting arm 22. At this time, the pivoting arm 22 can rotate about the first pin shaft 23 to an appropriate position. In the above embodiments, when the locking member 24 is at the locked position, the locking member 24 may come into contact with the slideway 210 by a circumferential surface (including the avoiding surface 2411*a*) of the first slider portion 2411 and a partial circumferential surface of the second slider portion 2412, such that there is a relatively large contact area between the locking member 24 and the slideway 210. When the locking member 24 is at the unlocked position, at least the first slider portion 2411 may be maintained to be in contact with the slideway 210. As such, not only the rotation of the pivoting arm 22 is not interfered, but also the first slider portion 2411 can guide the locking member 24 during subsequent movement to the locked position.

Referring to FIG. 1, in some embodiments, an angle limiting structure 2135 is further disposed at an edge of the arcuate wall 213. The angle limiting structure 2135 may be in contact with the first end 221 of the pivoting arm 22 to limit extreme positions of the pivoting arm 22 during rotation in the clockwise direction F1 and in the counter-clockwise direction F2. FIG. 1 illustrates the pivoting arm 22 being at one of the limit positions. In this case, the recessed stop 2212 of the pivoting arm 22 is just aligned to the protruding stop 2412*a* of the locking member 24. Therefore, the time required by a user to align the recessed stop 2212 to the protruding stop 2412*a* can be saved, and the user can easily lock the rotation of the pivoting arm 22 by the locking member 24.

Referring to FIG. 1, in some embodiments, when the locking member 24 is at the locked position, the two pivoting arms 22 are unfolded to be substantially on the same straight line. This corresponds to, for example, a normal use state of a baby carrier. When the locking member 24 is at the unlocked position, the two pivoting arms 22 can be pivoted about the respective first pin shafts 23. When the two pivoting arms 22 rotate to another limit position, the two pivoting arms 22 are folded to be parallel to each other relative to the pivoting base 21. This corresponds to, for example, a folded state of the baby carrier.

Still referring to FIG. 3 and FIG. 4, in some embodiments, the locking member 24 may include a connecting post 242, and a button 243 and the slider 241 are respectively disposed on both ends of the connecting post 242. The button 243 is located at the load bearing end 24*a*, and the slider 241 is located at the other end 24*b* opposite to the load bearing end 24*a*. In some embodiments, the slider 241 may include the first slider portion 2411 and the second slider portion 2412. In other embodiments, the slider 241 may have other configurations. A limiting plate 2101 is disposed in the slideway 210. The limiting plate 2101 divides the slideway 210 into a first slideway portion 211 and a second slideway portion 212, which are located on both sides of the limiting plate 2101, respectively. The button 243 is slidably mated with the first slideway portion 211, and the slider 241 is slidably mated with the second slideway portion 212. A through hole 2102 is formed in the limiting plate 2101 allowing the connecting post 242 to extend through. The limiting plate 2101 can limit axial moving positions of the button 243 and the slider 241, so as to prevent the locking member 24 from disengaging from the slideway 210. That is to say, the limiting plate 2101 forms an axial limiting structure to prevent the locking member 24 from disengaging from the slideway 210. In other embodiments, the axial limiting structure may include, for example, some steps formed at different positions of the slideway 210. The steps can limit moving positions of the button 243 and the slider 241, so as to prevent the locking member 24 from disengaging.

FIG. 4 illustrates the locking member 24 being at the locked position. The elastic restoring element 25 is a spring mounted in the first slideway portion 211 and located between the limiting plate 2101 and the button 243. In this embodiment, when the button 243 is pressed by the external force, the locking member 24 moves leftward in a direction indicated by an arrow L in FIG. 4 towards the unlocked position in the axial direction (substantially same as the extending direction of the slideway 210), and the spring is compressed. When the external force is removed, the locking member 24 moves rightward in a direction indicated by an arrow R in FIG. 4. The spring tends to drive the locking member 24 to move to the locked position in the axial direction. In other embodiments, the elastic restoring element 25 may include a spring mounted in the second slideway portion 212 and located between the limiting plate 2101 and the slider 241. For example, both ends of the spring are connected to the limiting plate 2101 and the slider 241, respectively. When the button 243 is pressed by the external force, the locking member 24 moves to the unlocked position and the spring is stretched. When the external force is removed, the spring tends to drive the locking member 24 to move to the locked position in the axial direction.

In some embodiments, the button 243 and the connecting post 242 may be integrally formed, for example, by injection molding. The slider 241 may be connected to the connecting post 242 by a fastener 26 (as shown in FIG. 4). In some embodiments, the fastener 26 is, for example, a bolt. The bolt extends through a through hole of the slider 241 and is threadedly engaged in a center hole of the slider 241.

Still referring to FIG. 3 and FIG. 4, in some embodiments, the pivoting base 21 may further include a sleeve portion 214. The sleeve portion 214, for example, extends from the arcuate wall 213 in a direction away from the first end 221 of the pivoting arm 22. A hook 2413 is disposed on the locking member 24. For example, the hook 2413 is disposed on the slider 241. The support connecting structure 200 further includes a fixing arm 27. A first end of the fixing arm 27 has a snap opening 270. The first end of the fixing arm 27 may be inserted into the sleeve portion 214. When the locking member 24 is at the locked position, the hook 2413 can extend into the sleeve portion 214 through an opening 2140 of the sleeve portion 214 and can be snapped into the snap opening 270, such that the fixing arm 27 is connected to the pivoting base 21. When the locking member 24 is at the unlocked position, the hook 2413 can escape from the snap opening 270, thus allowing the fixing arm 27 to be disengaged from the sleeve portion 214. As such, locking of the pivot position of the pivoting arm 22 relative to the pivoting base 21 and the detachable connection between the fixing arm 27 and the pivoting base 21 are associated by the same locking member 24. Therefore, the support connecting structure 200 having a simple structure and easy to fold and disassemble is provided. In some embodiments, for example, a limiting step is formed in the sleeve portion 214. The limiting step can, for example, abut against the first end of the fixing arm 27 to limit an insertion depth of the fixing arm 27 in the sleeve portion 214. When the hook 2413 is snapped into the snap opening 270, the limiting step can limit the fixing arm 27 from moving in a direction out of the sleeve portion 214.

In some embodiments, the hook 2413 includes a U-shaped plate 2413a, and a pair of hook-shaped portions 2413b connected to the U-shaped plate 2413a. The pair of hook-shaped portions 2413b can be snapped into the snap opening 270, simultaneously. The second slider portion 2412 of the slider 241 may include a groove 2410 configured to partially accommodate the U-shaped plate 2413a. The U-shaped plate 2413a may be, for example, detachably mounted in the groove 2410 by the fastener 26. Since the hook 2413, which is a vulnerable part, is detachably connected to the slider 241, the user can maintain and replace the hook 2413 conveniently. In some embodiments, the slider 241 may further include a separation portion 2401 extending between both opposite sidewalls of the U-shaped plate 2413a, thus improving the structural strength of the hook 2413.

Figure 5:
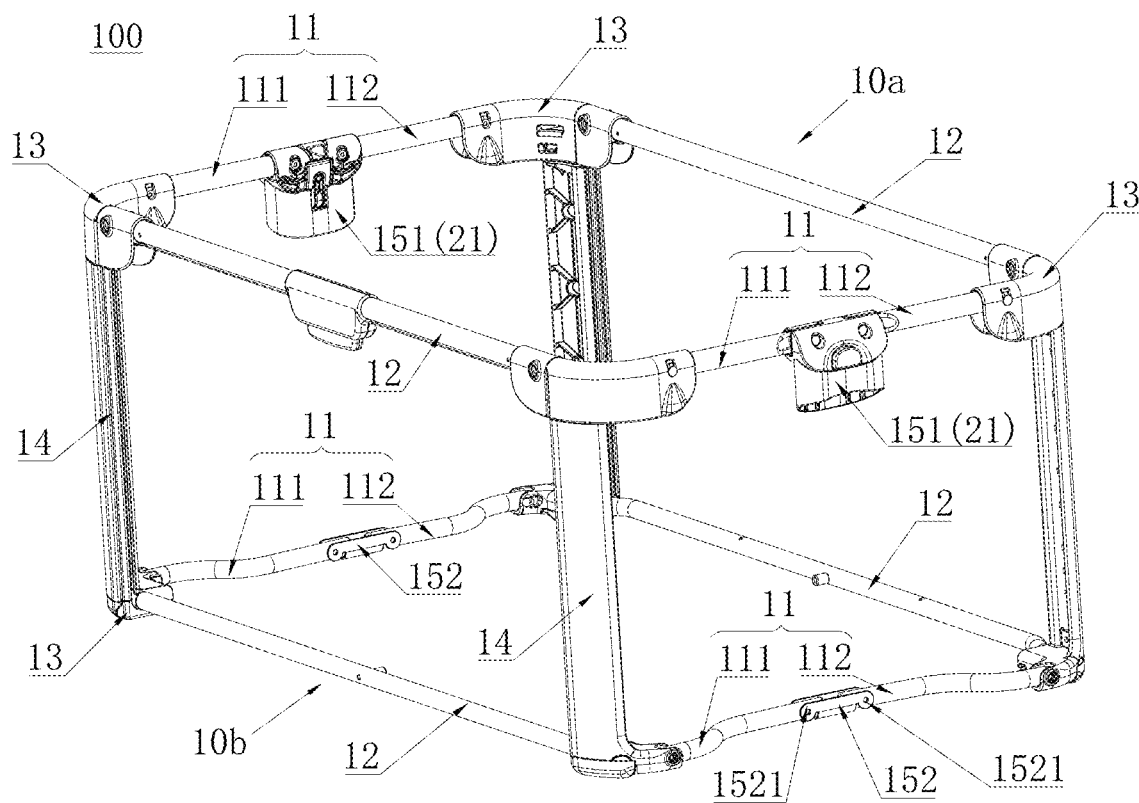
FIG. 5 is a schematic perspective view of a crib body of a baby crib according to an embodiment, where the crib body is in a completely unfolded state.
Figure 6:
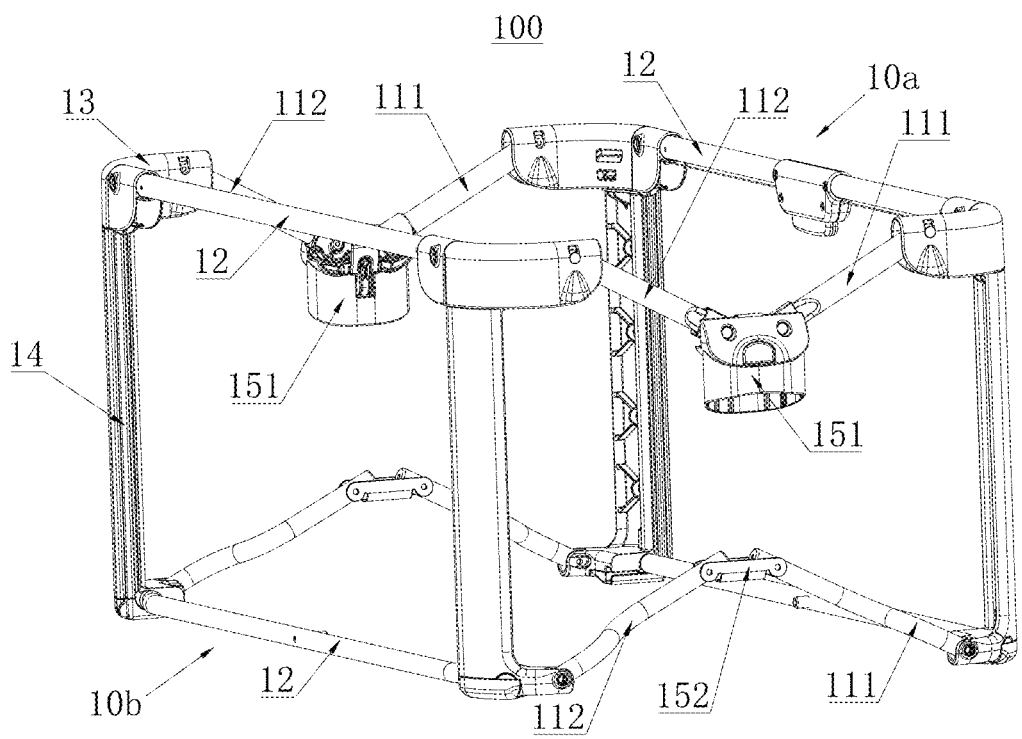
FIG. 6 is a schematic perspective view of the crib body of FIG. 5, where the crib body is in an incompletely unfolded state.
Figure 7:
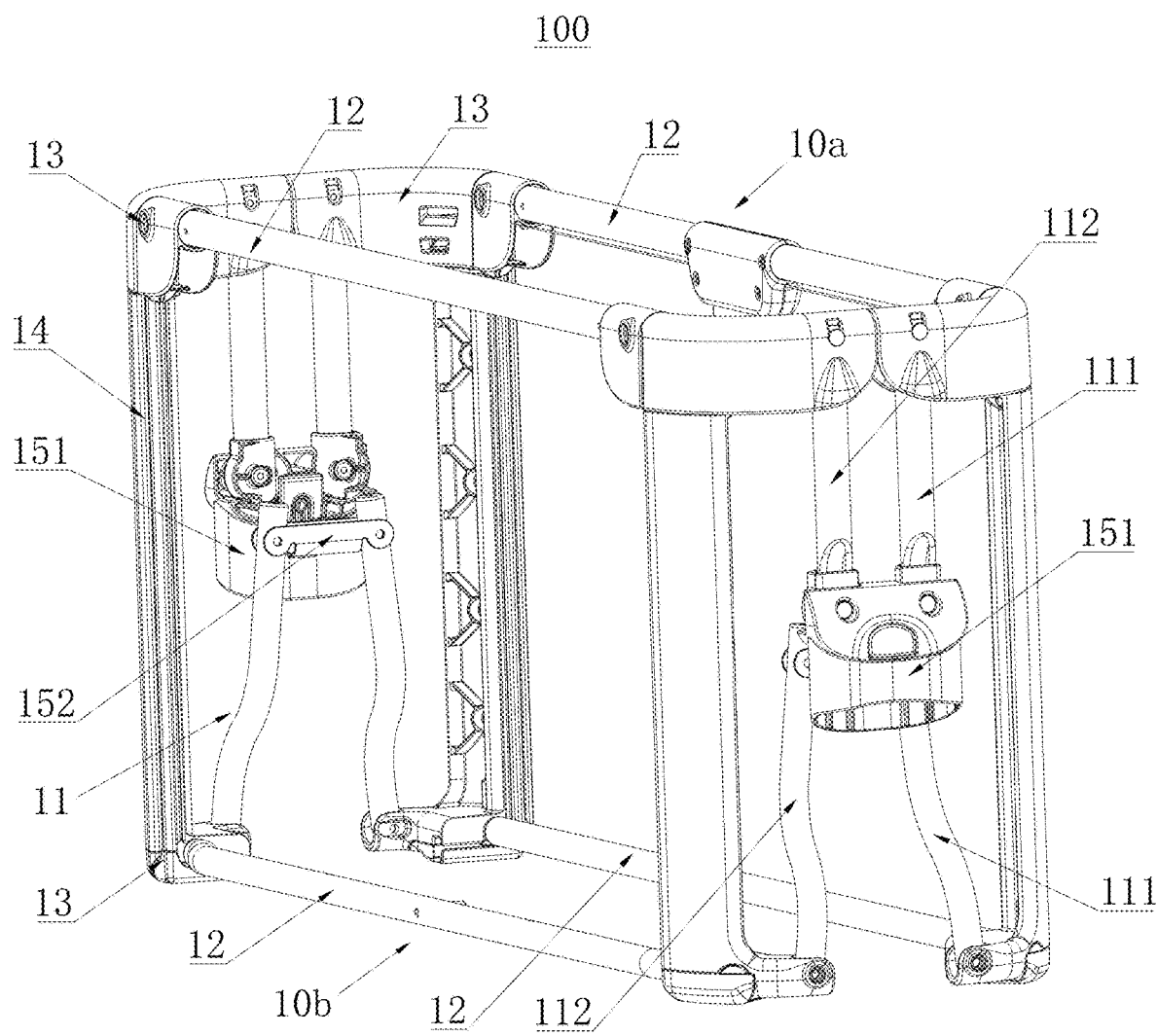
FIG. 7 is a schematic perspective view of the crib body of FIG. 1, where the crib body is in a completely folded state.

FIG. 5 to FIG. 7 show a perspective view of a crib body 100 of a baby crib according to some embodiments. The crib body 100 employs the support connecting structure 200 according to the above embodiments.

The crib body 100 may include an upper crib fence 10a and a lower crib fence 10b located under the upper crib fence 10a. The upper crib fence 10a and the lower crib fence 10b both have a substantially rectangular shape. The upper crib fence 10a and the lower crib fence 10b each includes a pair of first connecting rods 11 opposite to each other and a pair of second connecting rods 12 opposite to each other. The first connecting rod 11 and the second connecting rod 12 adjacent to each other are connected by a corner connector 13. The corner connector 13 of the upper crib fence 10a is connected to the corresponding corner connector 13 of the lower crib fence 10b by a vertical connector 14. In some embodiments, the corner connector 13 of corresponding corner portions of the upper crib fence 10a and the lower crib fence 10b and the vertical connector 14 may be formed as a whole.

In some embodiments, each first connecting rod 11 includes a first rotary arm 111 and a second rotary arm 112. End portions of the first rotary arm 111 and the second rotary arm 112 facing each other are pivotally connected to hinged bases 151, respectively. End portions of the first rotary arm 111 and the second rotary arm 112 facing away from each other are pivotally connected to the corresponding corner connectors 13, respectively. As such, during folding of the crib body 100, the hinged base 151 of the upper crib fence 10a approaches the corresponding hinged base 152 of the lower crib fence 10b, such that the pair of second connecting rods 12 of the upper crib fence 10a approach each other and the pair of second connecting rods 12 of the lower crib fence 10b approach each other (see FIG. 6), thereby folding the crib body 100 into a folded state (see FIG. 7).

Referring to FIG. 5, each first connecting rod 11 of the upper crib fence 10a has the structure of the support connecting structure 200 in the above embodiments. That is to say, the first rotary arm 111 and the second rotary arm 112 of each first connecting rod 11 serve as the pivoting arms 22 of the support connecting structure 200, and the hinged base 151 corresponding to each first connecting rod 11 of the upper crib fence 10a serves as the pivoting base 21 of the support connecting structure 200. The hinged base 152 corresponding to each first connecting rod 11 of the lower crib fence 10b is a groove-shaped member having an open top. Both ends of the groove-shaped member are provided with lugs 1521 configured to be pivotally connected to the corresponding first rotary arm 111 and second rotary arm 112.

It should be understood that, in other embodiments, each first connecting rod 11 of the lower crib fence 10b may have the structure of the above support connecting structure 200. In addition, in other embodiments, one of the first connecting rods 11 of the upper crib fence 10a may have the structure of the above support connecting structure 200, and the other of the first connecting rods 11 of the upper crib fence 10a does not have the structure of the above support connecting structure 200, as long as the first rotary arm 111 and the second rotary arm 112 of the other of the first connecting rods 11 can be pivoted relative to the corresponding hinged base 151 in any appropriate form without affecting the overall folding effect of the crib body 100.

It should be understood that, in other embodiments, each second connecting rod 12 of the upper crib fence 10a and the lower crib fence 10b may be folded. For example, at least part of the second connecting rod 12 may have the structure of the above support connecting structure 200.

It is to be noted that, according to each first connecting rod 11 and each second connecting rod 12 having the structure of the above support connecting structure 200, the hinged base serving as the pivoting base 21 of the support connecting structure 200 may be provided with the sleeve portion 214 and the hook 2413 according to requirements, or may not be provided with the sleeve portion 214 or the hook 2413 according to requirements.

In some embodiments, referring to FIG. 7, when the crib body 100 is folded, the hinged base 152 of the first connecting rod 11 of the lower crib fence 10b is located on an inner side of the corresponding hinged base 151 of the upper crib fence 10a. By overlapping the hinged base 152 and the hinged base 151, the overall height of the crib body 100 after folding is reduced.

FIG. 8 to FIG. 12 show a perspective view of a baby crib according to an embodiment. The baby crib may include the crib body 100 according to the above embodiments. The baby crib further includes a crib support 300 configured to support the crib body 100.

Figure 9:
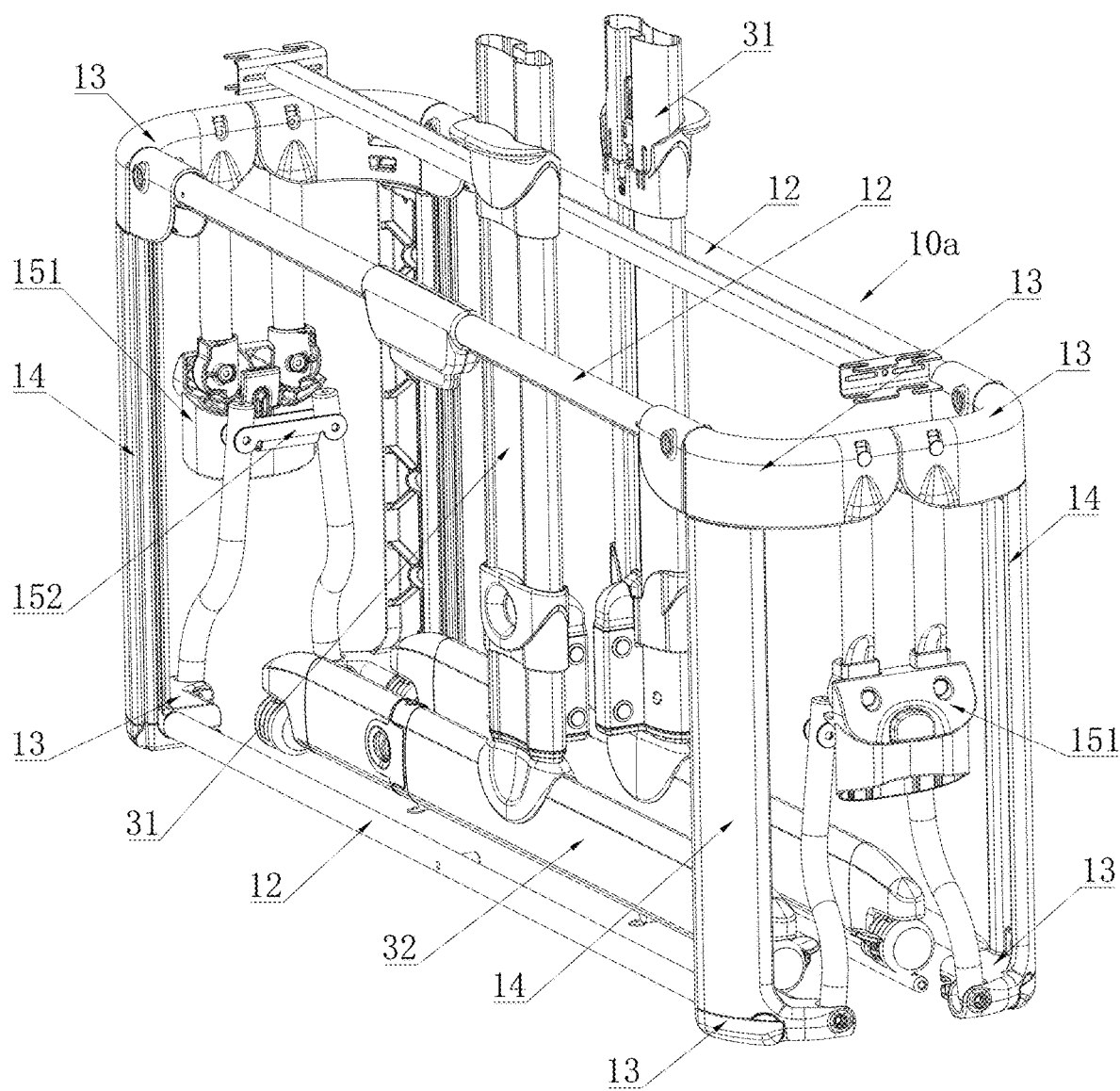
FIG. 9 is a schematic perspective view of the baby crib of FIG. 8, where the crib body is in a folded state, and a crib support is separated from a crib body.

In some embodiments, the crib support 300 is detachably connected to the crib body 100 to facilitate the storage of the baby crib (see FIG. 9). The crib support 300 may include a pair of vertical supports 31 and bases 32 connected to the vertical supports 31 respectively. An upper end of each vertical support 31 is detachably connected to the hinged base 151 of the first connecting rod 11 of the upper crib fence 10a. In some embodiments, the first connecting rod 11 uses the structure of the support connecting structure 200 in the above embodiments. The hinged base 151 of the first connecting rod 11 serves as the pivoting base 21 provided with the sleeve portion 214 and the hook 2413. Each vertical support 31 serves as the fixing arm 27. An opening 310 (see FIG. 10) is provided in an upper end of each vertical support 31. The opening 310 serves as the snap opening 270 for the hook 2413 to be snapped in. It may be understood that, by switching the locking member 24 of the support connecting structure 200 between the locked position and the unlocked position, the vertical support 31 can be easily fixed to the hinged base 151 or disassembled from the hinged base 151.

In some embodiments, a height of each vertical support 31 is adjustable, so as to adjust a height of the crib body 100. A wheel 33 facilitating movement of the baby crib may be disposed on each base 32. The wheel 33 may be provided with an anti-rotation lock to prevent unexpected rolling of the wheel 33. The crib body 100 may be surrounded by a ruffle 400 (see FIG. 12). The ruffle 400 is, for example, made of fabric to define a space for accommodating a baby. A cushion may be further provided in the ruffle 400.

Figure 10:
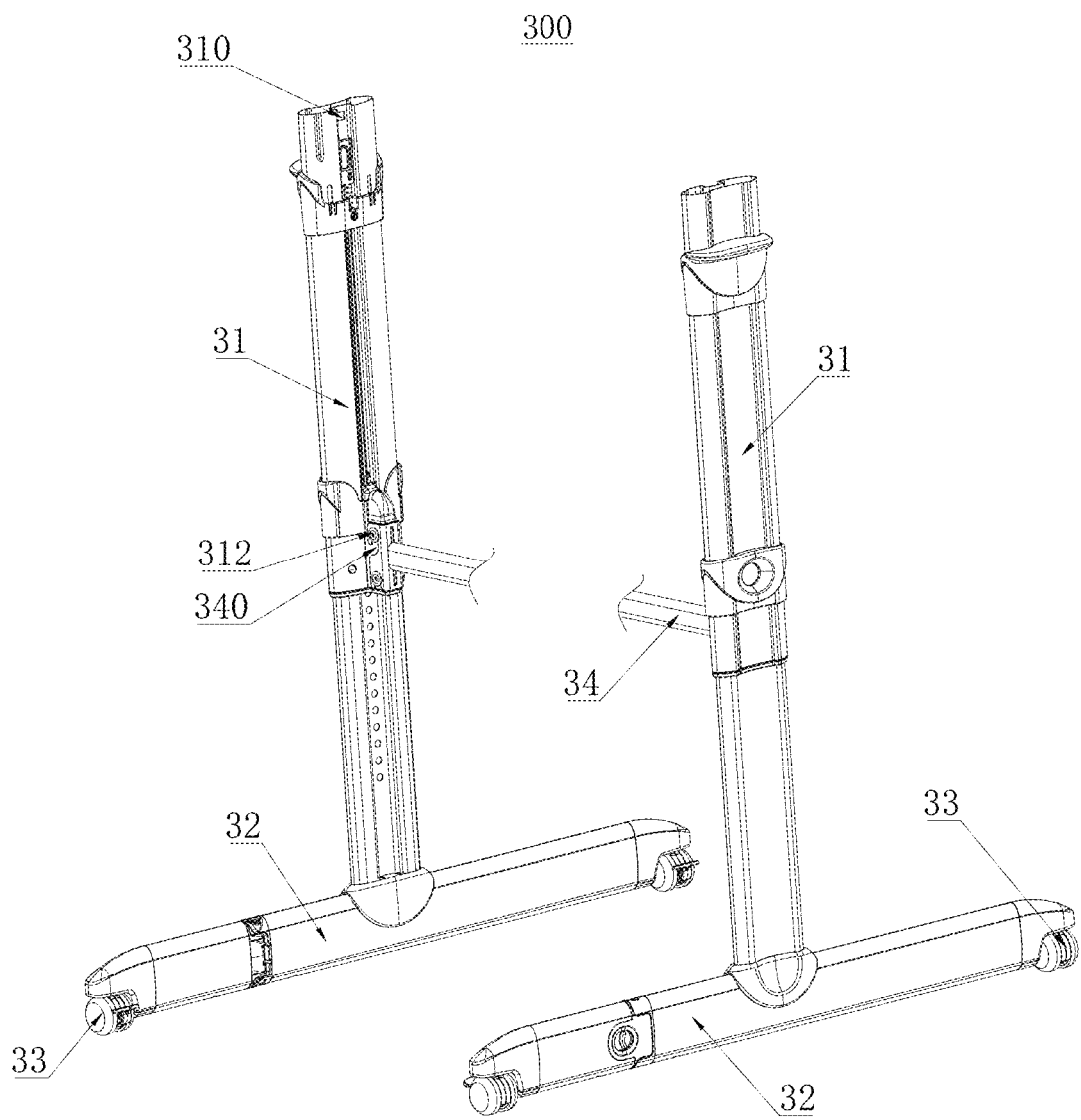
FIG. 10 is a schematic perspective view of the crib support of FIG. 8.
Figure 11:
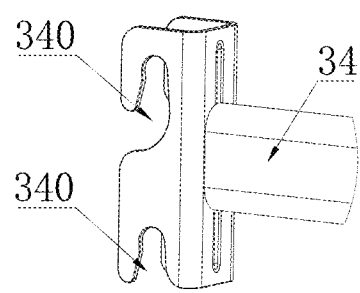
FIG. 11 is an enlarged view of a stiffening beam of FIG. 10.
Figure 12:
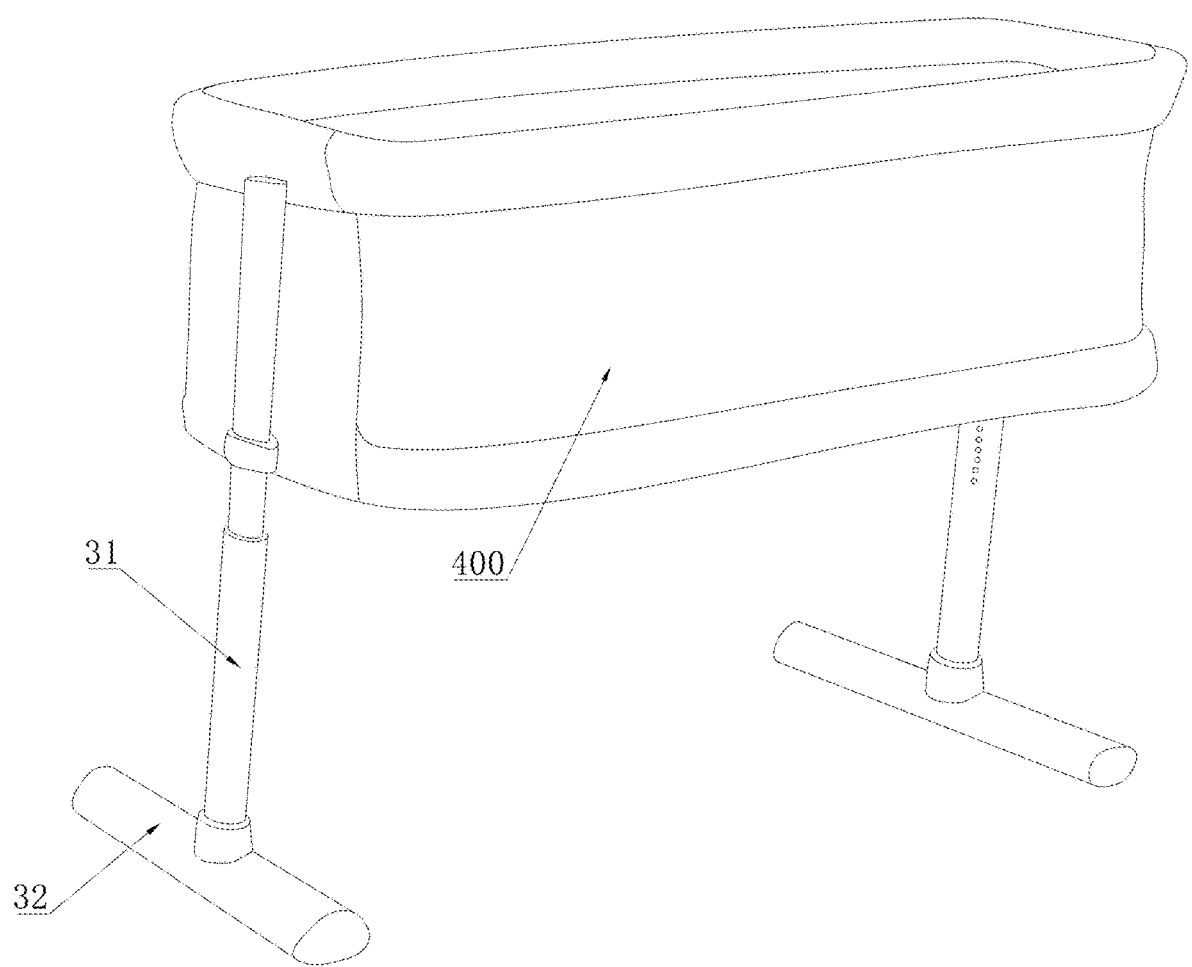
FIG. 12 is a schematic perspective view of a baby crib according to an embodiment.

In some embodiments, the crib support 300 may further include a stiffening beam 34 located under the crib body 100. Both ends of the stiffening beam 34 are detachably connected to the pair of vertical supports 31, respectively. As such, not only the structural stability of the crib support 300 is improved, but also the crib support 300 can be conveniently assembled and disassembled. Referring to FIG. 10 and FIG. 11, in some embodiments, a slot 340 is provided in the end of the stiffening beam 34. The slot 340 has an opening at a bottom thereof, and the vertical support 31 is provided with a boss 312 that can be snapped into the boss 312 from the opening. The boss 312 may be a pin shaft mounted to the vertical support 31, or may be a bolt mounted to the vertical support 31.

Figure 8:
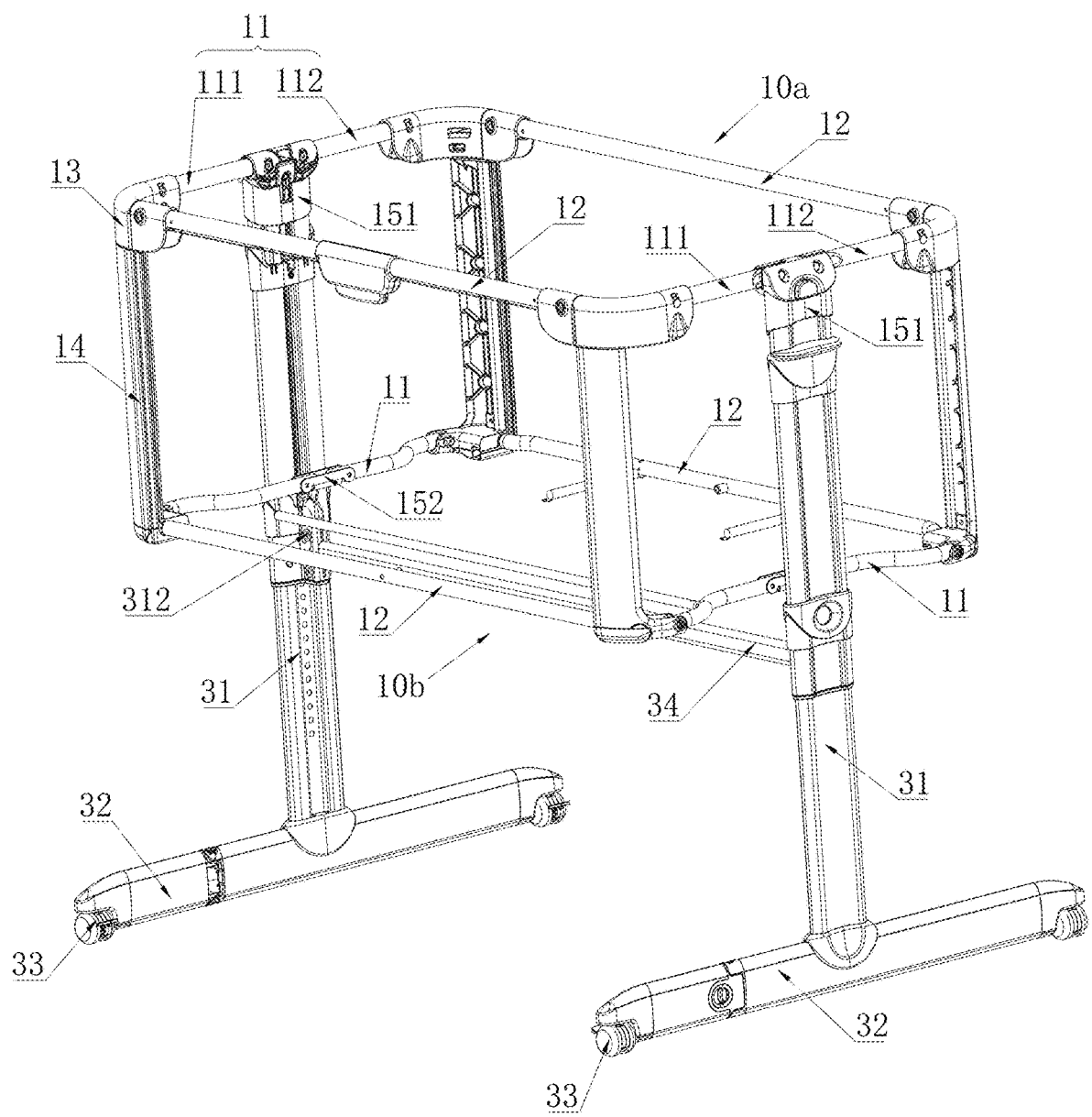
FIG. 8 is a schematic perspective view of a baby crib according to an embodiment.

Referring to FIG. 8, when the crib support 300 supports the crib body 100, the hinged base 152 of the lower crib fence 10b is located on an inner side of the pair of vertical supports 31. That is to say, each first connecting rod 11 of the lower crib fence 10b is recessed inward relative to the vertical support 31. During folding of the crib body 100, the vertical support 31 may be disassembled from the crib body 100 or the upper end of the vertical support 31 is maintained to be in contact with the corresponding hinged base 151, the hinged base 152 of each first connecting rod 11 of the lower crib fence 10b may move upward and is finally located on the inner side of the hinged base 151 of each first connecting rod 11 of the upper crib fence 10a. As such, the overall longitudinal height of the crib body 100 after folding is reduced.

It is to be noted that, the crib body 100 may be provided with other structures according to requirements. In addition, although the crib body 100 shown in the FIG. 8 is similar to a baby hammock having a relatively small longitudinal depth, it should be understood that, the crib body 100 provided in the embodiments is not limited to the baby hammock, and may also be, for example, a baby playpen.

In addition, although the support connecting structure 200 is applicable to the baby crib according to the aforementioned embodiments, it should be understood that, the support connecting structure 200 may further be applicable to other baby carriers such as a baby stroller, such that rod members on the baby carriers can be conveniently unfolded and folded. As mentioned above, the support connecting structure 200 is further applicable to other fields in addition to the baby carriers.

In addition, a support according to an embodiment is provided. The support includes the above pivoting base 21 and the locking member 24. The support is configured to mount the above pivoting arm 22. The support is applicable to any suitable field, including, but not limited to, baby carriers.

Although the respective embodiments have been described one by one, it shall be appreciated that the respective embodiments will not be isolated. Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the appended claims.

What is claimed is:

1. A support connecting structure, comprising:
   a pivoting base;
   a pivoting arm, wherein a first end of the pivoting arm is connected to the pivoting base by a first pin shaft, and the first end of the pivoting arm comprises a first anti-rotation surface; and
   a locking member mounted to the pivoting base, the locking member being capable of moving in a direction parallel to an axis of the first pin shaft so as to move to a locked position or an unlocked position, and the locking member comprising a second anti-rotation surface;
   wherein when the locking member is at the locked position, the first anti-rotation surface abuts against the second anti-rotation surface, and when the locking member is at the unlocked position, the first anti-rotation surface is separated from the second anti-rotation surface;
   wherein the pivoting base comprises a slideway slidably mated with the locking member;
   wherein one of the first end of the pivoting arm and the locking member comprises a recessed stop, and the other one of the first end of the pivoting arm and the locking member comprises a protruding stop, wherein a surface of the recessed stop is configured to form one of the first anti-rotation surface and the second anti-rotation surface, and a surface of the protruding stop is configured to form the other one of the first anti-rotation surface and the second anti-rotation surface;
   wherein the pivoting base comprises an arcuate wall, a middle portion of the arcuate wall has an overlapping portion that coincides with the slideway, and the overlapping portion is provided with a notch;
   wherein the first end of the pivoting arm comprises an arcuate portion slidably mated with an inner wall surface of the arcuate wall, and the recessed stop is located at the middle portion of the arcuate portion;

wherein the protruding stop is located at the locking member; and wherein in response to the locking member being at the locked position, the protruding stop is latched in the notch and is snapped with the recessed stop through the notch.

2. The support connecting structure according to claim 1, further comprising an elastic restoring element configured to keep the locking member at the locked position, wherein in response to being subjected to an external force, the locking member moves to the unlocked position by overcoming a force of the elastic restoring element.

3. The support connecting structure according to claim 1, wherein the locking member comprises a first slider portion and a second slider portion slidably mated with the slideway, the first slider portion is located on an inner side of the second slider portion and has an avoiding surface, the avoiding surface is slidably mated with the overlapping portion and is capable of moving to the notch, and the protruding stop is located on the second slider portion.

4. The support connecting structure according to claim 3, wherein the second slider portion has a substantially rectangular shape.

5. The support connecting structure according to claim 1, wherein an edge of the arcuate wall is provided with an angle limiting structure configured to limit a rotation angle of the pivoting arm.

6. The support connecting structure according to claim 1, wherein when the locking member is at the locked position, a load bearing end of the locking member or the other end of the locking member opposite to the load bearing end does not protrude out of the slideway.

7. The support connecting structure according to claim 1, wherein the pivoting base is provided with an axial limiting structure configured to prevent the locking member from disengaging from the slideway.

8. The support connecting structure according to claim 1, wherein the first anti-rotation surface is an inclined surface or a bending surface, and the second anti-rotation surface is an inclined surface or a bending surface.

9. The support connecting structure according to claim 1, wherein two pivoting arms are provided, the first ends of the two pivoting arms are respectively connected to the pivoting base by two first pin shafts, and the first ends of the two pivoting arms are mated with the same locking member.

10. The support connecting structure according to claim 9, wherein when the locking member is at the locked position, the two pivoting arms are located substantially on the same straight line, and when the locking member is at the unlocked position, the two pivoting arms rotates about the respective first pin shafts to be parallel to each other.

11. A crib body of a baby crib, comprising the support connecting structure according to claim 1.

12. The crib body according to claim 11, wherein the crib body comprising an upper crib fence and a lower crib fence, the upper crib fence and the lower crib fence each comprises a pair of first connecting rods opposite to each other and a pair of second connecting rods opposite to each other, and each first connecting rod and each second connecting rod adjacent to each other are connected by a corner connector, the corner connector of the upper crib fence is connected to the corner connector of the lower crib fence by a vertical connector; each first connecting rod comprises a first rotary arm and a second rotary arm, end portions of the first rotary arm and the second rotary arm facing each other are respectively pivotally connected to hinged bases, and end portions of the first rotary arm and the second rotary arm away from each other are respectively pivotally connected to the corresponding corner connectors, so as to allow the hinged base of the upper crib fence and the corresponding hinged base of the lower crib fence to approach each other during folding of the crib body, such that the pair of second connecting rods of the upper crib fence approach each other and the pair of second connecting rods of the lower crib fence approach each other;

the first rotary arm and the second rotary arm of the first connecting rod of the upper crib fence serve respectively as the pivoting arms of the support connecting structure, and the hinged base corresponding to the first connecting rod serves as the pivoting base of the support connecting structure.

13. The crib body according to claim 12, wherein the hinged base corresponding to each first connecting rod of the lower crib fence is a groove-shaped member having an open top, both ends of the groove-shaped member are provided with lugs configured to be pivotally connected to the corresponding first rotary arm and second rotary arm, respectively.

14. The crib body according to claim 12, wherein when the crib body is folded, the hinged base of the lower crib fence is located on an inner side of the corresponding hinged base of the upper crib fence.

15. A baby crib, comprising the crib body according to claim 11, and a crib support connected to the crib body.

16. A support connecting structure, comprising:
a pivoting base;
a pivoting arm, wherein a first end of the pivoting arm is connected to the pivoting base by a first pin shaft, and the first end of the pivoting arm comprises a first anti-rotation surface; and
a locking member mounted to the pivoting base, the locking member being capable of moving in a direction parallel to an axis of the first pin shaft so as to move to a locked position or an unlocked position, and the locking member comprising a second anti-rotation surface;
wherein when the locking member is at the locked position, the first anti-rotation surface abuts against the second anti-rotation surface, and when the locking member is at the unlocked position, the first anti-rotation surface is separated from the second anti-rotation surface;
wherein the pivoting base comprises a slideway slidably mated with the locking member;
wherein the locking member comprises a connecting post, and a button and a slider respectively disposed on both ends of the connecting post, the second anti-rotation surface is formed on the slider; and
wherein the slideway is provided with a limiting plate therein, the limiting plate divides the slideway into a first slideway portion and a second slideway portion that are respectively located on both sides of the limiting plate, the limiting plate has a through hole allowing the connecting post to extend through, the button is slidably mated with the first slideway portion, and the slider is slidably mated with the second slideway portion.

17. The support connecting structure according to claim 16, wherein the first slideway portion is provided with a spring located between the limiting plate and the button, or the second slideway portion is provided with a spring located between the limiting plate and the slider.

18. The support connecting structure according to claim 16,
wherein the slideway has a notch corresponding to the slider, the protruding stop is located on the slider, and the recessed stop is located on the first end of the pivoting arm; and
wherein when the locking member is at the locked position, the protruding stop is latched in the notch and is snapped with the recessed stop through the notch.

19. The support connecting structure according to claim 16, wherein the button and the connecting post are integrally formed, and the slider is connected to the connecting post by a fastener.

20. The support connecting structure according to claim 16,
wherein the pivoting base comprises a sleeve portion, the slider is provided with a hook, the support connecting structure further comprises a fixing arm, a first end of the fixing arm has a snap opening, the first end of the fixing arm is sleeved in the sleeve portion, and
wherein when the locking member is at the locked position, the hook extends into the sleeve portion and is snapped into the snap opening, and when the locking member is at the unlocked position, the hook escapes from the snap opening.

21. The support connecting structure according to claim 20, wherein the hook comprises a U-shaped plate and a pair of hook-shaped portions connected by the U-shaped plate, the pair of hook-shaped portions are configured to be snapped into the snap opening, the slider comprises a groove configured to partially accommodate the U-shaped plate, the U-shaped plate is detachably mounted in the groove.

22. The support connecting structure according to claim 21, wherein the slider comprises a separation portion extending between two opposite sidewalls of the U-shaped plate.

23. A support connecting structure, comprising:
a pivoting base;
a pivoting arm, wherein a first end of the pivoting arm is connected to the pivoting base by a first pin shaft, and the first end of the pivoting arm comprises a first anti-rotation surface; and
a locking member mounted to the pivoting base, the locking member being capable of moving in a direction parallel to an axis of the first pin shaft so as to move to a locked position or an unlocked position, and the locking member comprising a second anti-rotation surface;
wherein when the locking member is at the locked position, the first anti-rotation surface abuts against the second anti-rotation surface, and when the locking member is at the unlocked position, the first anti-rotation surface is separated from the second anti-rotation surface;
wherein the pivoting base comprises a sleeve portion, the locking member is provided with a hook, the support connecting structure further comprises a fixing arm, a first end of the fixing arm has a snap opening, the first end of the fixing arm is sleeved in the sleeve portion, and
wherein when the locking member is at the locked position, the hook extends into the sleeve portion and is snapped into the snap opening, and when the locking member is at the unlocked position, the hook escapes from the snap opening.

24. A baby crib, comprising:
a crib body comprising the support connecting structure according to claim 23, wherein the crib body comprises an upper crib fence and a lower crib fence, wherein the upper crib fence and the lower crib fence each comprises a pair of first connecting rods opposite to each other and a pair of second connecting rods opposite to each other, and each first connecting rod and each second connecting rod adjacent to each other are connected by a corner connector, wherein the corner connector of the upper crib fence is connected to the corner connector of the lower crib fence by a vertical connector;
each first connecting rod comprises a first rotary arm and a second rotary arm, end portions of the first rotary arm and the second rotary arm facing each other are respectively pivotally connected to hinged bases, and end portions of the first rotary arm and the second rotary arm away from each other are respectively pivotally connected to the corresponding corner connectors, so as to allow the hinged base of the upper crib fence and the corresponding hinged base of the lower crib fence to approach each other during folding of the crib body, such that the pair of second connecting rods of the upper crib fence approach each other and the pair of second connecting rods of the lower crib fence approach each other; and
a crib support configured to support the crib body and detachably connected to the crib body,
wherein the crib support comprises a pair of vertical supports and bases connected to the vertical supports, respectively, an upper end of each vertical support is detachably connected to the hinged base of the upper crib fence;
wherein the first rotary arm and the second rotary arm of the first connecting rod of the upper crib fence serve respectively as the pivoting arms of the support connecting structure, the hinged base corresponding to the first connecting rod serves as the pivoting base of the support connecting structure, and the vertical support connected to the hinged base of the first connecting rod serves as the fixing arm.

25. The baby crib according to claim 24, wherein a height of each vertical support is adjustable, a wheel is disposed on each base, and a ruffle surrounds the crib body.

26. The baby crib according to claim 24, wherein the crib support further comprises a stiffening beam located under the crib body, both ends of the stiffening beam are detachably connected to the pair of vertical supports, respectively.

27. The baby crib according to claim 26, wherein an end of the stiffening beam is provided with a slot having an opening at a bottom thereof, the vertical support is provided with a boss configured to be snapped into the slot.

28. The baby crib according to claim 24, wherein when the crib support supports the crib body, the hinged bases of the lower crib fence are located on an inner side of the pair of vertical supports.

* * * * *